United States Patent [19]

Wolfe et al.

[11] Patent Number: 5,049,333

[45] Date of Patent: Sep. 17, 1991

[54] BRIQUET FORMING APPARATUS AND METHOD

[75] Inventors: James G. Wolfe, Pleasanton; Michael T. Humphrey, Tracy, both of Calif.

[73] Assignee: The Clorox Company, Oakland, Calif.

[21] Appl. No.: 583,633

[22] Filed: Sep. 17, 1990

[51] Int. Cl.[5] ............................................. B29C 43/08

[52] U.S. Cl. ..................................... 264/109; 44/596; 44/636; 425/362; 425/363

[58] Field of Search ............... 264/109, 118, 119, 123; 425/78, 362, 363, 237; 44/596, 636

[56] References Cited

U.S. PATENT DOCUMENTS

| | | | |
|---|---|---|---|
| 781,781 | 2/1905 | Milne | 425/362 |
| 1,769,383 | 7/1930 | Navone | 425/362 |
| 1,964,969 | 7/1934 | Werner | 425/362 |
| 2,600,532 | 6/1952 | Hale et al. | 425/362 |
| 2,662,246 | 12/1953 | Klugh et al. | 425/362 |
| 2,675,304 | 4/1954 | Komarek | 44/596 |
| 3,593,378 | 7/1971 | Metrailer | 425/362 |
| 4,017,241 | 4/1977 | Papinchak et al. | 425/237 |
| 4,496,366 | 1/1985 | Peters | 44/530 |

FOREIGN PATENT DOCUMENTS

| | | | |
|---|---|---|---|
| 513063 | 5/1955 | Canada | 425/362 |
| 1068279 | 6/1954 | France | 425/362 |
| 56889 | 6/1924 | Sweden | 425/362 |

*Primary Examiner*—Mary Lynn Theisen
*Attorney, Agent, or Firm*—Harry A. Pacini

[57] ABSTRACT

Apparatus and method for preparing briquets of charcoal or the like with various shapes, preferably half pillow or "D" shape, in which briquets are molded between roll type press for compressing particulate material wherein mold cavities are circumferentially arranged on one press roll and the other press roll is blank or flat with alternating integral moving cheek plates and stationary guide bars cooperating with said mold cavities in the pinch area; thus resulting in briquets which are easily released and removed from the mold cavity areas.

8 Claims, 7 Drawing Sheets

BRIQUET FORMING APPARATUS AND METHOD

BACKGROUND OF THE INVENTION

This invention relates to the field of manufacture of charcoal briquets and other solid fuel compositions in briquet formats of preferred geometric configurations. More particularly this invention relates to to the apparatus useful in the preparation of preferred designs of briquets of dimensional and geometric specifications and configurations to achieve desired lighting and burn characteristics with respect to intended uses, such as barbecue cooking.

The most common example of such fuel compositions are charcoal briquets which comprise comminuted char of various vegetable materials, such as wood, hulls, pits, and other agricultural waste material which is mixed with a binder and rolled, pressed, or otherwise formed into briquets. However, the present invention has application to the manufacture of other solid compositions, such as comminuted wood or organic material, soap, metal ores and the like otherwise rolled, pressed or extruded into pellets, discs, briquets or other shapes.

Charcoal briquets presently available are typically provided in a "pillow" shape which provides for reasonably satisfactory ease of manufacture by the supplier and handling by the consumer. However, little attention has been paid to their burning characteristics as related to their shape. As is well known, such briquets are typically used for cooking on a grill or the like by preparing a multiplicity of briquets in a mounded configuration, igniting their surface by some auxiliary ignition means such as lighter fluid, electric heaters, etc., and waiting until ignition of a significant portion of the briquets has progressed until a majority of the exposed surface is ignited and burning has progressed inwardly toward the interior of the briquet. As burning proceeds inwardly from the surface of the briquet, a gray ash is formed theron. Thus completion of the initial "ignition phase" of burning is identifiable by the formation of such visual ash on the briquet, and is defined herein as the time at which there is 60–75% visual ash formation on the briquets.

Thereafter the ignited briquets are typically spread under a grill or the like for cooking, and they continue to burn with an intense heat throughout a "burn phase". For maximum performance of such briquets it is desirable that the ignition phase be limited in time so that the briquets may be used for cooking without undue delay, and that the burn phase be extended to provide adequate cooking time for the use intended. It is further desirable to obtain such desirable combustion performance in the most efficient manner with respect to the amount of fuel consumed.

There have been very little prior art developments related to design of solid fuel compositions and articles for desired combustion performance. Other than some work on ornamental configuration of fuel briquets, as well as some attempt to improve the geometrical configuration of briquets, such attempts have not provided desired optimal ignition and burning characteristics. The only recently improved configured fuel briquets is the "D"-shaped briquet as disclosed in U.S. Pat. No. 4,496,366, the disclosure of which is incorporated herein by reference.

Whereas other prior art briquets have recognized that the surface area to volume ratio of the briquet may affect ignition and burn characteristics, U.S. Pat. No. 4,496,366 has provided a solid fuel briquet which displays selected ignition and burn characteristics having a preferred "D"-shaped, half-pillow geometric configuration.

Previous processes utilizing cheek plates placed the cheek plates that formed the sides of the briquet on the same press roll as the pocketed roll. As a result, the product formed in the pocketed press roll adhered to the pockets and was difficult to release. The present invention overcomes the problems associated with the various other prior art processes and briquetting presses utilizing pocketed press rollers with cheek plates adhered thereto. See for example U.S. Pat. No. 3,593,378.

Further, prior art apparatus relies upon the compression of the product on the trailing edge of the pocket to force the product out of the forming rolls. The problem of product adhesion sometimes can be corrected by controlling the physical and chemical characteristics of the material to be compressed.

SUMMARY OF THE INVENTION

This invention relates to new and novel improvements in the apparatus for the manufacture of charcoal briquets. Particularly this invention is directed to improvements in briquet manufacture, in which the briquets are molded or formed between two tangentially arranged press mold rolls or drums, wherein at least one of which circumferentially contains a plurality of briquet forming mold pockets in cooperation with moving cheek plates on at least one of the press mold rolls and guide base, so that solid fuel material is compacted therein into briquets, as said molding rolls or drums rotate in opposite directions and apply pressure to a quantity of briquet forming particles in the mold pocket.

The present invention is envisioned as being of particular application to production of briquets of high strength and preferred configuration. However, the invention is not necessarily limited in this particular application to a single geometric form of briquet, but may also be applied to making high strength briquets from other materials and in other preferred and selected configurations. The most preferred briquet configuration of the present invention is a "D"-shaped briquet. The preparation of such a "D"-shaped briquet presents various problems, such as material adhesion to press rolls, which are overcome by the design and use of the apparatus of the present invention.

It is therefore an object of the present invention to provide an improved method and apparatus for the continuous production of "D"-shaped briquets. Said "D"-shaped briquets having substantially straight sides and at least one curved surface, wherein the improved apparatus of this invention includes a plurality of open, sideless "U"-shaped cavities circumferentially placed on at least one tangentially interacting paired press roller having associated therewith and cooperating with the press rollers, moving cheek plates spaced therebetween on the cooperating press roller without said channels or cavities and stationary rectangular spacer or guide bars alternating with the cheek plates therebetween.

Another object is to provide improved apparatus for manufacture and continuous production of "D"-shaped briquets wherein compression or surface marking of each briquet is accomplished during the formation of each briquet and the briquets so produced conform to the mold or cavity in which they are formed. The briquets produced thereby having a general uniform thickness through the midsection and tapering along opposite edges to relatively sharp edges, and two parallel opposed sides which are relatively perpendicular with respect to the base thereof, having smooth surfaces.

Yet another object of this invention is to provide an apparatus for manufacture and continuous production of shaped molded briquets by press roll compression wherein the product briquets are readily freed and removed from the mold cavity.

DESCRIPTION OF THE PREFERRED EMBODIMENT

Figure 1:
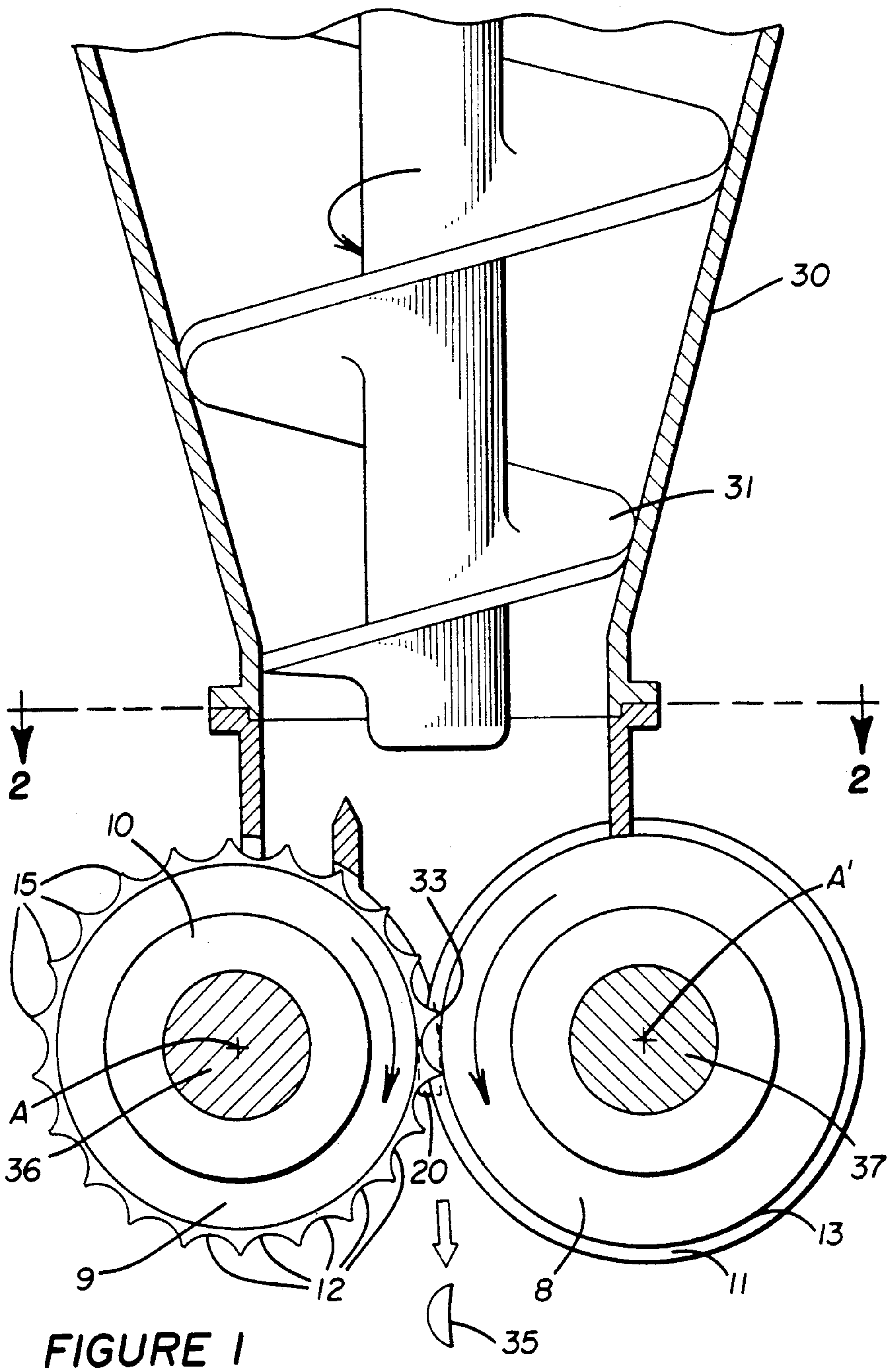
FIG. 1 is a generally assembly side view of the press roller assembly with the feed hopper mounted thereabove.

The preferred shaped briquet of charcoal or the like which is embodied in the present improved briquet forming apparatus and method is the half pillow or "D" shaped briquet. Briquets of such configuration may be constructed with any desired dimensional relationships without departing from the present invention. However, as disclosed in U.S. Pat. No. 4,496,366, incorporated herein by reference, the preferred "D" briquet has a base, B, equal to two times the depth. The total arc of the half-pillow briquet is 120°. Therefore the radius is $\frac{1}{2}\sqrt{2s^2}/\sin 60°$ and $1=\sqrt{2s^2}$. In the "D"-shaped briquets, the radius of the arc, is $\alpha=2h=(b/2 \sin 60°$.

With reference to the Figures described hereinabove the present invention can be described as follows.

This invention utilizes compression techniques of size enlargement to produce agglomerated briquet products from comminuted char of various vegetable materials. By this technique suitable force is applied to particulates held in a confined space, such as a briquet form molding pocket.

In the following description of the preferred embodiment; FIGS. 1-5 are now generally referred to.

In roll presses, particulate material is compacted by squeezing as it is carried into the gap or pinch area 33 between two tangentially interacting press rolls 8, 9 rotating at equal speed. This is probably the most versatile method of size enlargement since most materials can now be agglomerated by this technique with the aid of binders, heat, and/or very high pressures if needed. In other prior art briquetting equipment, pillow shapes are formed by corresponding (matching) indentations in each of the rolls. Precise design of these pockets based on practical experience is important to ensure optimum briquet density, minimum incidental fines production, overall uniform product size and shape, and dependable pocket release of the finished briquets.

Therefore a roll press consists of the frame, at least two rolls that perform the pressing and the associated bearings, reduction gears, and fixed or variable speed drives. Spacers between housings prevent roll contact and allow adjustment of roll spacing. The frame of the press is designed so that all forces are absorbed internally. The rolls are forced together by a hydraulic system which may incorporate appropriate safety valves to prevent over pressure if foreign material intrudes between the roll faces. The rolls consist of a continuous roll shaft, the roll body and attached molding equipment. The molding surface may be either solid or divided into segments.

Within the preferred embodiment of the present invention superior performance and formation of charcoal briquets are possible. Therefore the present invention contemplates a new and improved roll-type press wherein between a pair of rolls cooperating together, the rolls have mold pockets or cavities 12 on one roll 9 facing only. The second roll 10 is preferably blank with no pockets. The rolls interact tangentially so as to form a pinch space 33 between the faces of the rolls. As in roll-pressing equipment, the particulate material is compacted by squeezing the material as it is carried into the pinch space 33 between the two rotating rollers.

In addition, the present invention includes a novel arrangement of cheek plates 11 on one roll 8 in conjunction with the mold pockets or cavities 12 on the second roll 9. That is, whereas cheek plates are generally placed on the roll with the mold pockets and mold pockets are placed on both rolls, the present invention utilizes a novel placement and arrangement of the cheek plates with respect to the mold pockets and the roll containing the mold pockets.

Previous processes and equipment utilizing cheek plates placed the cheek plates on the same roll as the mold pockets. As a result, molded product adhered to the cheek plates and pockets and was difficult to release. The present invention preferably places the cheek plates 11 in alternating position on the flat roll 8 so that the product will adhere, if at all, to the flat roll and could be removed by a scraper means, if necessary. Further, such an arrangement aids to prevent wedging of material between the closely spaced cheek plates 11. According to the present invention, the cheek plates are preferably staggered or placed between alternative rows on the flat roll 8.

In addition, in order to make it possible to form a briquet having three flat sides, sharp edges and a "D" curved configuration, stationary guide bar members 20 securely mounted on a frame or platen 19 above the roll presses, protrude in the same direction and alternately in a staggered configuration between the rows !3 on the flat roll 8. The protruding stationary guide bar members 20 extend preferably downwardly between the rows of pockets in the vicinity of the pinch area 33 between the pocket or cavity roll 9 and the flat roll 8, where no cheek plates are present on the opposing rolls, so as to form one side of the briquet forming mold pocket as the two press rolls interact, with a given duplicate 11 forming the other side of the briquet. These guide bar members 20 allow the formed briquet product to either drop freely from the mold pocket or cavity roll 9 or to adhere to the flat roll 8 where it can be removed with a scraper means.

Various prior art processes, e.g., U.S. Pat. No. 3,593,378, rely on compression of the product on the trailing edge of the mold pocket 12 to force the briquet product from the mold pocket roll. Such a briquet product adhesion problem in the mold cavity often can be corrected by controlling the physical and chemical characteristics of the material compacted into briquets. However, in the present invention, by contrast, by the arrangement of the alternating and staggered positioning of the cheek plates 11 on the flat roll 8 and the stationary vertical bar members 20 meshing between the mold pocket rolls 8, causes molded briquet product 35 to preferentially adhere to the surface of the flat roll 8. The arrangement and design of the rolls of the present invention will permit otherwise existing constraints on the pocket shapes and sizes to be removed. Hence a greater variety of products to be roll pressed is permitted.

Therefore, by the present invention it is possible to press roll charcoal briquets which have three flat sides, one rounded side and six sharp edges separating the sides, i.e., substantially "D" shaped. Such a briquet product will ignite faster than corresponding briquets with rounded contours without sharp edges and lower net surface area. The present invention is adaptable to full scale roll press briquetting process wherein existing manufacturing facilities may be used with slight modification. Further, continuous operation with similar operating costs as present processes are achieved.

Referring to the figures, there is shown a roll-type press 10 provided with a multiple series of paired tangentially cooperating rolls 8 and 9. The circumferential face of one roll 8 is in tangential operative proximity with the circumferential face of the other roll 9. Each series of rolls is mounted for rotation in opposite directions about its respective axis, A,A'. The drive shaft 29 is suitably coupled to a convenient power source (not shown). The power source drives shafts 21 and 22 by a suitable gear means 23.

A hopper 30 containing a vertically oriented drive shaft 31, such as a screw feed, represents a feed means for charging particulate briquetting matter into the U-shaped depressions 12 as the depressions approach the pinch area 33 formed between the opposed roll press pairs. Therein compression of the particulate briquetting matter is initiated as the rolls rotate toward each other. The vertical shaft 31 is driven by any suitable motor and drive means or motor and drive-transmitting means (not shown) for rotating said paired rolls.

The circumference of each roll 8 and 9 is unique. A first roll 9 is provided with a continuous series of sideless depression pocket molds 12 (or cups) where n is an integer representing the number of pocket molds that can circumscribe the outer surface of the roll. A second roll 8 is blank, that is it has no mold pockets but is smooth. It may appear in the figures accompanying this description that the size of the pockets has a lesser length than width. The converse may be true. That is, the width of the pocket may be less than the length of the or both the width and the length could be the same.

Further, a plurality of pockets on each individual press roll is contemplated. That is with consideration for the placement of a cheek plate 11 between the alternating rows of pockets 12 on the outer circumferential surface of press roll 9. A sufficient number of pockets will populate the surface of the roll to yield an even number of pockets thereon. As expected the exact dimension of the issuing briquet will be determined by the configuration and by the shape of the pockets. There is no need to be concerned with the positioning of the pockets with respect to the interacting rolls 8, 9.

The individual pocket 12 is in effect an open "U"-shaped configuration or depression. That is, on the press roll 9 the pocket is an open "U" shaped depression without sides. The formation of the straight sides is defined by and caused by the (a) cheek plate 11 and (b) by the stationary protruding guide-bar rods 20.

The cheek plates are substantially flat plate-like radially disposed protrusions outwardly rising from the outer surface 13 of the blank flat press roll 8. The cheek plate 11 extends radially outwardly from the outer surface 13 of the flat press roll 8 a sufficient distance to interact with and cooperate with a corresponding depression or channel 14 in the pocket mold thereby forming a seal and one straight side to the "U" shaped depression 12 in the pocket press roll 9. The second straight side to the "U" shaped depression to form a pocket mold form substantially having a closed "D" shape is formed by the edge of the stationary guide bar rod 20 mounted on a plate or frame in the feed zone and extending therefrom and protruding into channel 14 in the region of the press rolls as described above. As the mold rolls 8, 9 rotate toward each other a new unfilled cup forms which is filled with charged briquet matter and is urged towards the pinch area 33, such that at the maximum pressure and pocket closure in the pinch area 33 a complete enclosed filled pocket is formed.

The stationary guide bar members 20 are securely mounted on a plate or frame located above the rolls, but in close proximity to permit protruding into the press roll area and extending into alternating channels or depressions 14 between in the pocket mold rolls; thereby forming in the pocket press roll the second side to the "U" shaped depression. In operation a given pocket mold member, i.e. "U" shaped depression 12 in the circumference of the pocket ring mold, will see a first straight side formed from the moving cheek plate 11 and a second straight side formed by the side of the adjacent stationary guide bar rod 20 and a curved "U" shape formed by the depression 12 in the pocket press roll. The net result is the formation of a solid briquet having substantially a half-pillow or "D" shape with substantially straight sides and at least one curved surface and relatively sharp edges.

However, it is contemplated in another embodiment that the vertical guide bar rods 20 can be so affixed and positioned and securely mounted on a plate or frame located below the rolls, but in close proximity thereto and extending upwardly from beneath into the pinch area 33. The proximity to the pinch area 33 is similar to the placement of the guide bar rods when located above the rolls. Thus in a similar alternating configuration with the cheek plates on the flat-faced roll press, the vertically positioned guide bar rods form an enclosed compression volume in the pinch area 33.

The individual "U" shaped depressions 12 in the pocket press roll 9 are arranged in continuous order around the circumference of the press roll. The press roll 9 having a width across the face of the press roll equal to the width of the desired "D" shaped briquet. Between each "U" shaped depression is a point or cusp 15 having a sharp or slender and tapering terminal part separating each consecutive "U"-shaped depression around the circumference of the press roll.

The individual pockets formed from the "U" shaped depression in the pocket press roll 9, the adjacent cheek plate 11 and the adjacent cooperating stationary guide bar 20 are arranged so that as a formed pocket is rotated and comes into contact with the surface 13 of the flat press roll 8 a complete enclosed "D" shaped pocket results. Thus, as briquets are produced each individual briquet is formed separately and cleanly. There is no problem of alignment or resulting misalignment during briquet formation.

Particulate char material introduced into the pockets is compressed in the pinch area 33 as the pockets 12 rotate into contact with surface 13 of the flat-faced press roll 8. At times the resulting compressed material is formed into series or strings of briquettes. However, the junction between the briquets is relatively weak and as the string of briquets fall from the press roll and move along on suitable conveying means, the string of briquets will break apart into the preferred individual briquets. The individual briquets of such issuing series or strings of briquets are readily broken apart, one briquet from another. Moreover, forces are generated in the handling of the briquets which aid in the breaking apart of any series or string of briquets into individual briquets, resulting scraps, excess char, or fines may be recycled after screening, if necessary.

Figure 2:
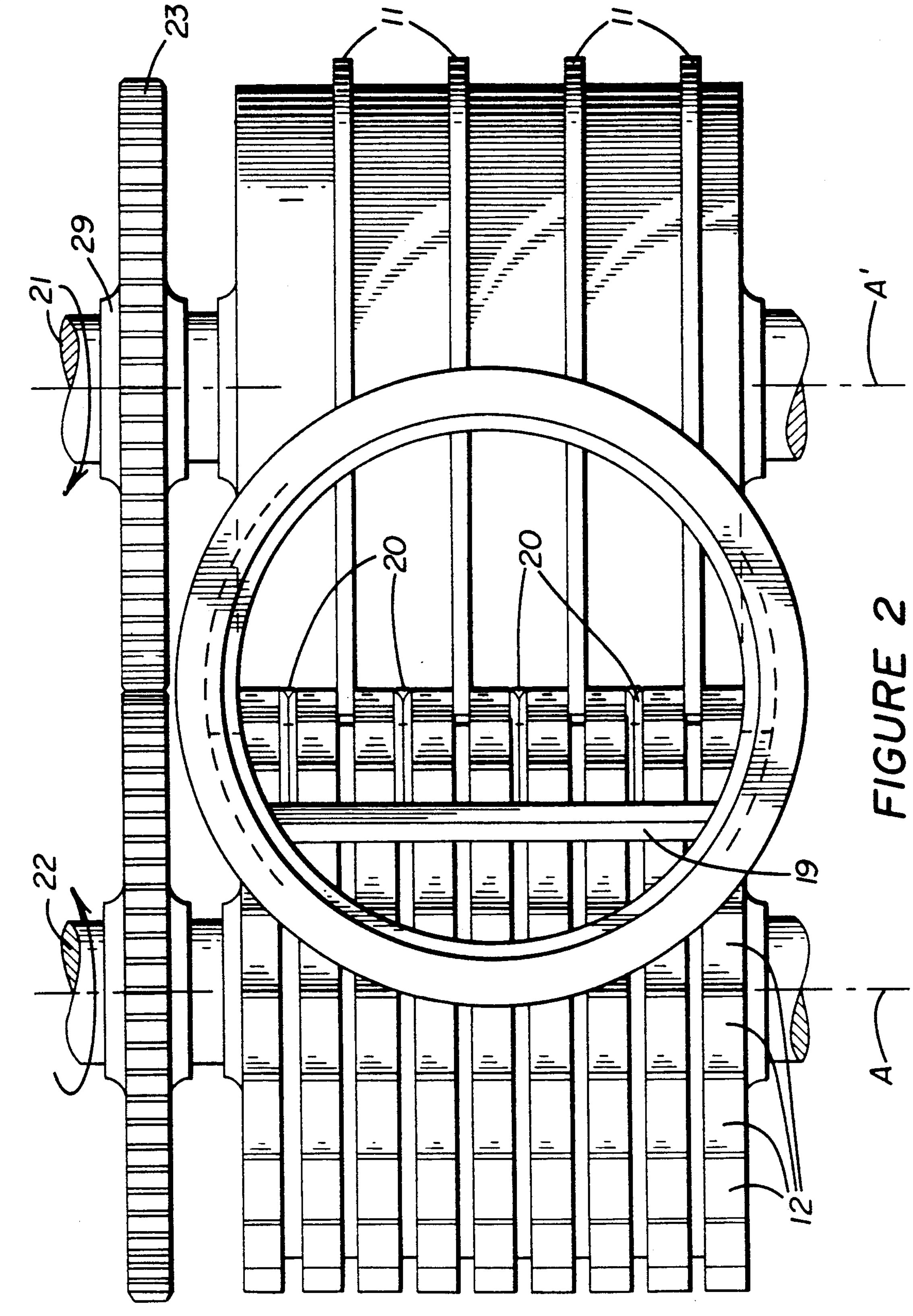
FIG. 2 is a view along 2—2 of FIG 1 depicting in a plan view a pair of tangentially cooperating press rolls according to the instant invention.
Figure 3:
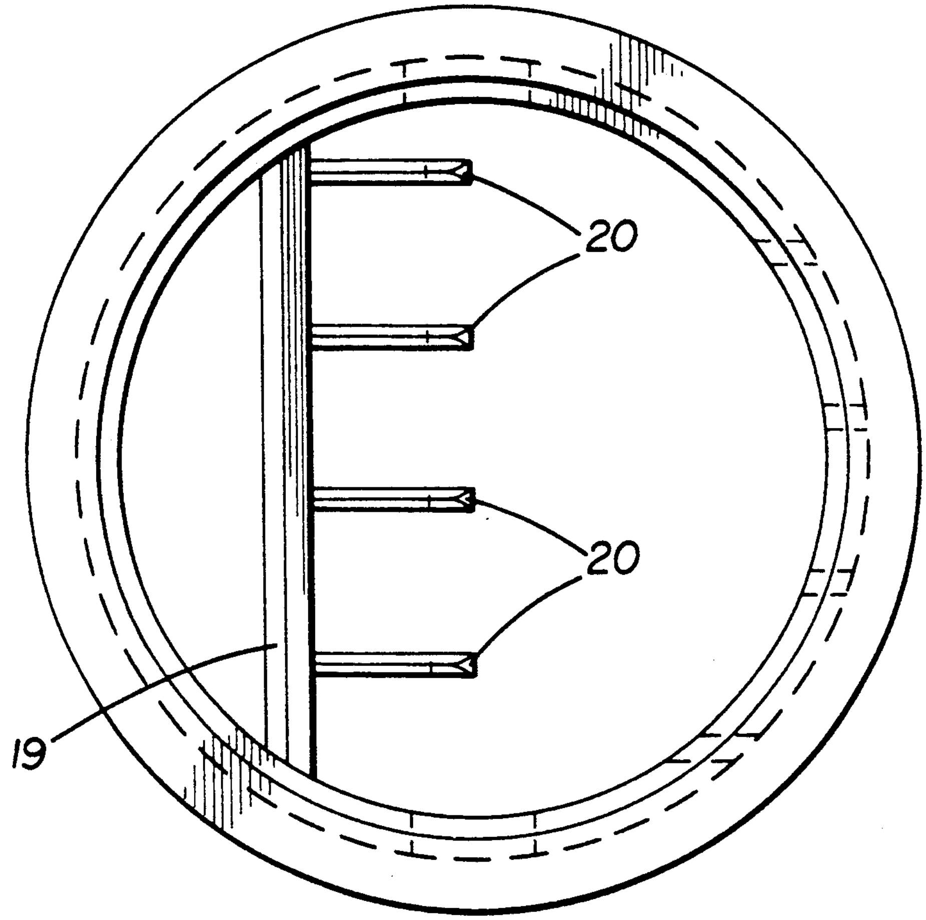
FIG. 3 is a top view through the feed base without the screw feed in place.
Figure 4:
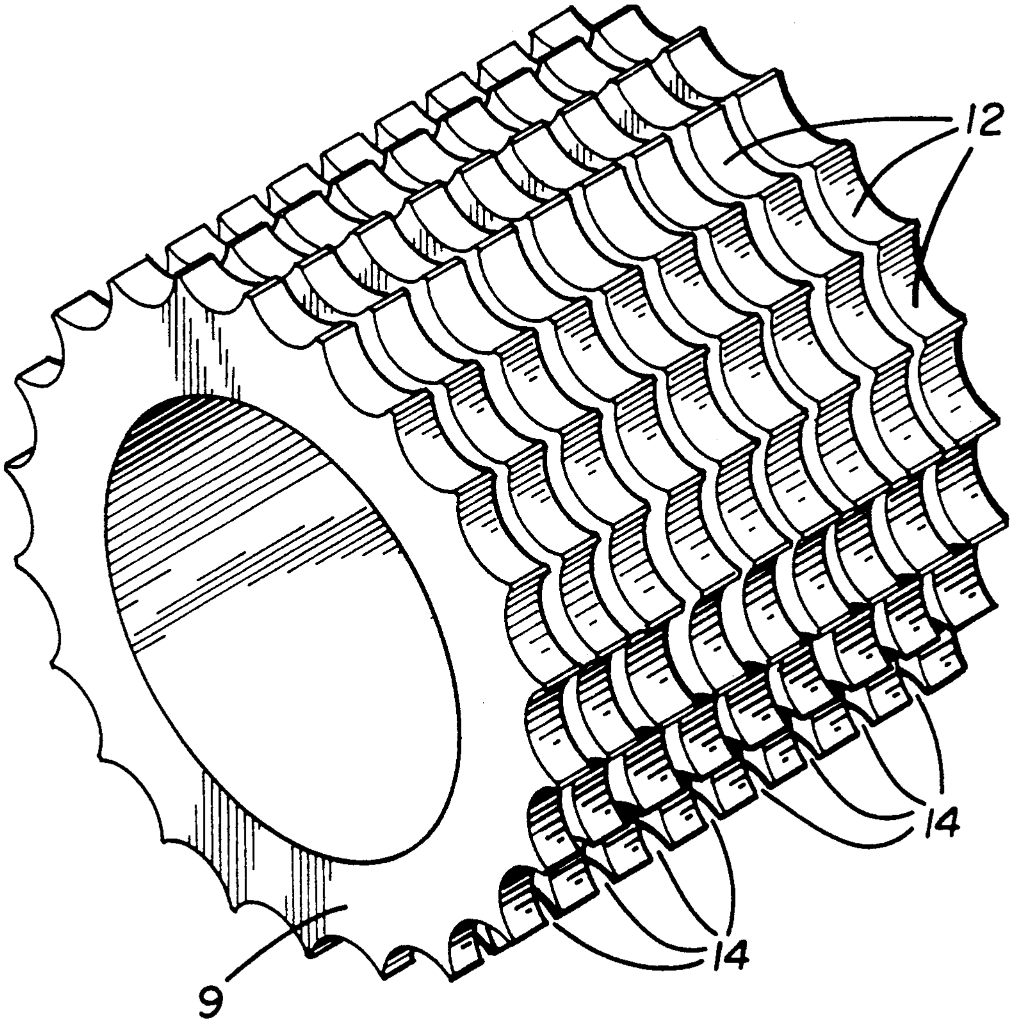
FIG. 4 depicts a preferred multiple pocket press roll design.
Figure 5:
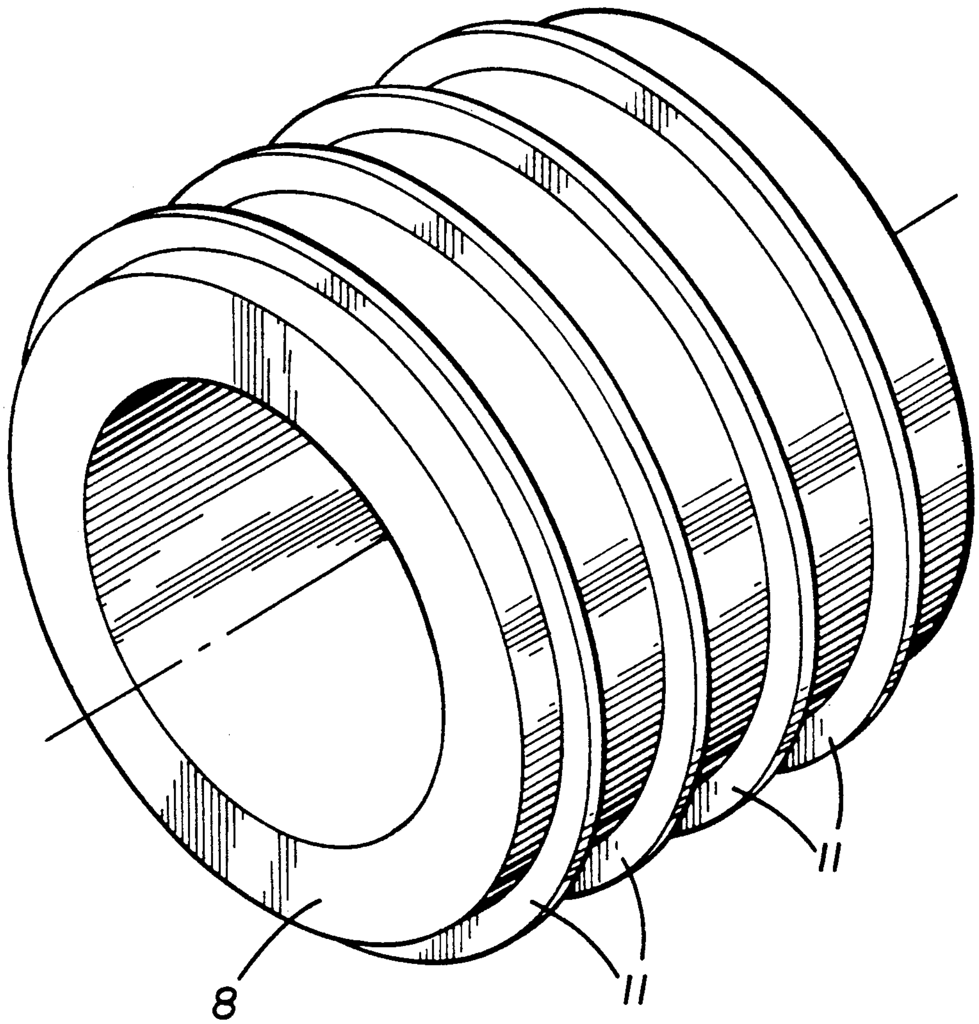
FIG. 5 depicts a preferred flat roll press design with cheek plates alternating between individual rolls.
Figure 6:
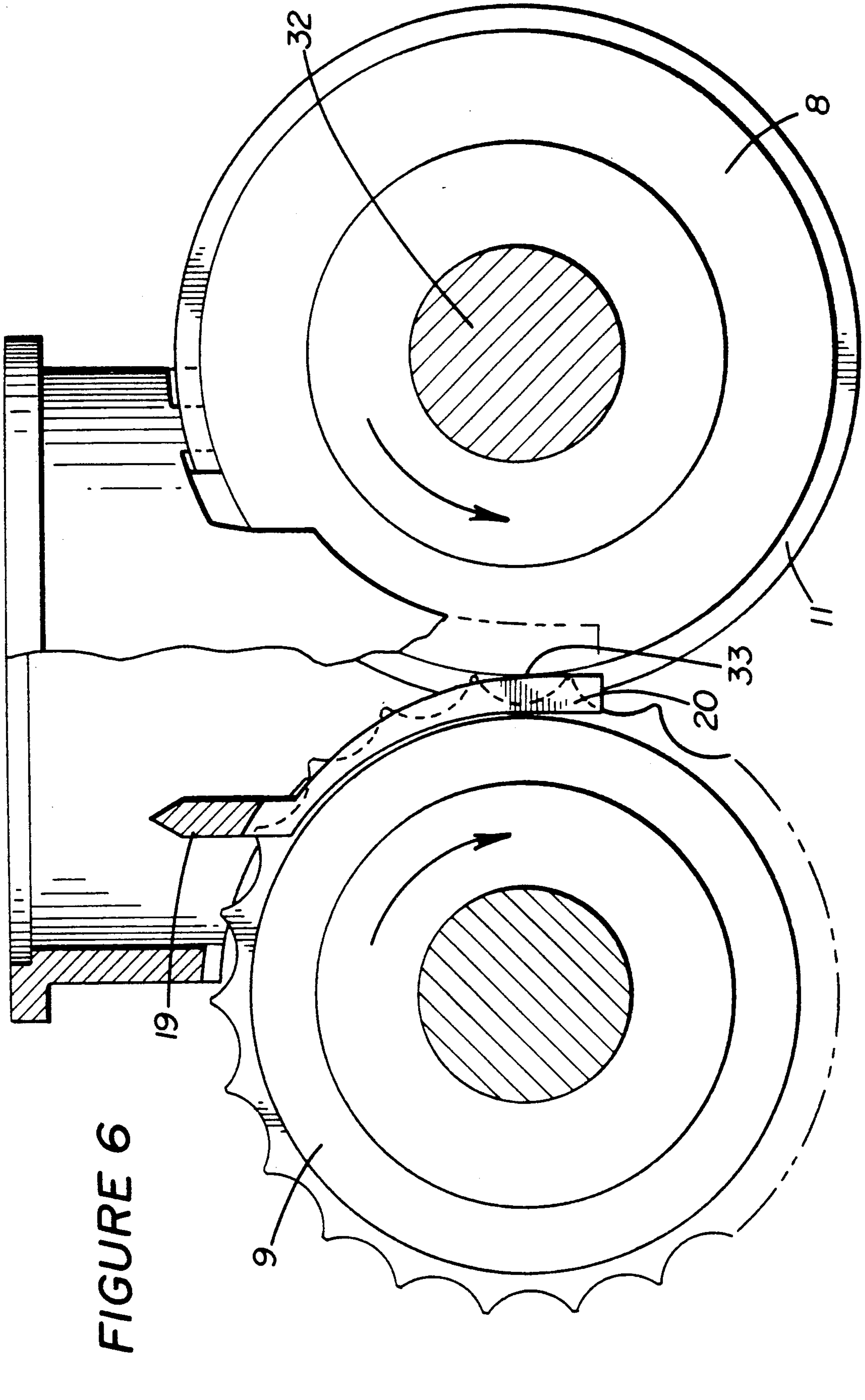
FIG. 6 depicts the embodiment of this invention wherein the spacer bars project downward from the feed base.

Preferably, the roll briquetting device of this invention utilizes a series of alternating radially spaced apart pocketed mold rolls 9 as shown in FIGS. 2 and 4, wherein the spacing area is a depression or channel 14. Said depression or channel 14 cooperating with a series of correspondingly spaced apart flat rolls 8 wherein the spacing is alternating cheek plates between every other width equivalent to two individual pocketed mold rolls 9. Each of the channels 14 on the pocket roll alternately overlaps and cooperates with a cheek plate 11 from the flat roll 8 and a vertical guide bar rod 20 positioned in the pinch area 33.

An analysis of the conditions, formation and design of the device of this invention, and the resultant product therefrom exhibits the improved development which prevents the formed briquets from becoming wedged in the forming pocket or from being wedged between adjacent cheek plates. Instead the product "D" shaped briquet adheres to the flat roll and could, if necessary, be easily removed with a scraper or the like. However, applicants have found that supplemental ejection means are surprisingly unnecessary. With the alternating cheek plates on the opposing rolls to form the sides of the briquets, and with the protruding stationary guide bars the product is found to either drop freely or, if desired, could be removed easily with a scraper means.

Further, by setting the angle of arc subtended by the rounded pocket surface to preferably greater than 90° and, to ensure high product strength the arc angle has been maintained, preferably less than 130°. All flat surfaces are so designed as to be in motion relative to the pocketed press rolls. No more than two pairs of the parts of the device of this invention used for forming the relatively flat sides of the briquet may be in motion relative to the pockets. More particularly, all the parts of the device used for forming the relatively flat sides of the briquets must be in motion relative to the pockets. Although appearing to be rolls revolve.

There are two criteria which define the spatial and dynamic arrangement of the three members forming the straight sides and the pocket of the "U"-shaped depression of the resulting briquets. These members are: a cheek plate, a guide rod bar, and the flat or smooth surface of a press roll. The criteria are: (1) that all three members forming the flat sides of the compressed briquet must be in motion relative to the pockets; and (2) no more than two members forming the three flat sides of the briquet may be stationary with respect to each other.

Figure 7:
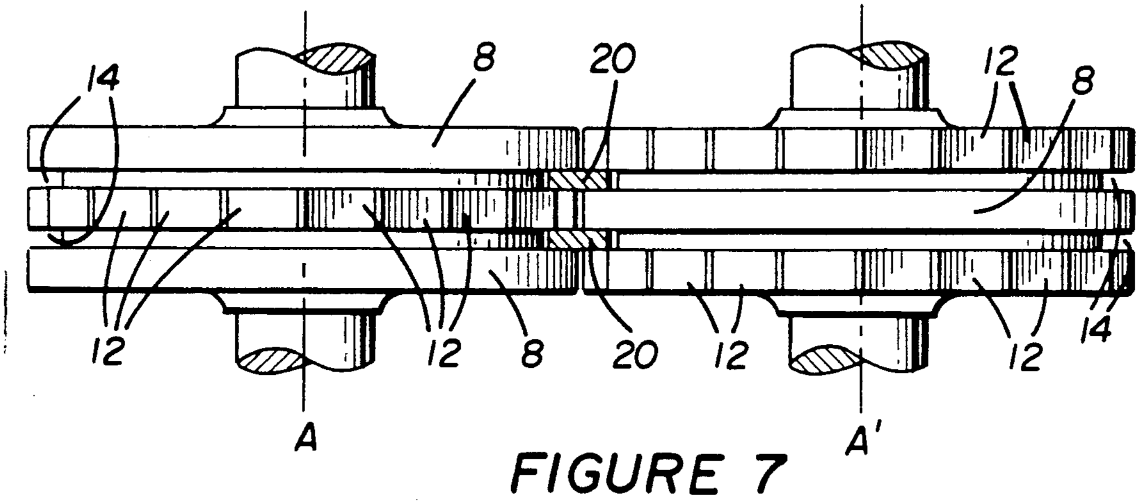
FIG. 7 depicts the embodiment where each roll is composed of multiple alternating rows of pocklets and flat or smooth rows.

With these criteria in mind, in another embodiment, each roll is composed of multiple alternating rows of pockets and flat or smooth rows. See FIG. 7. Such that the two rolls are arranged to coincide with the alternating rolls on a pocketed row opposite a flat or smooth row. This configuration requires only guide rods 20 to form the substantial straight sides of the compressed briquet. No cheek plates can be present between the rows. If a cheek plate were present, then the cheek plate would be adjacent to a "U"-shaped depression in a relative stationary position. The presence of two adjacent sides next to the pocket would tend to cause the formed briquet to adhere in the pocket. Hence, the requirement that all members of the equipment forming the flat sides must be in motion relative to the pockets.

Figure 8:
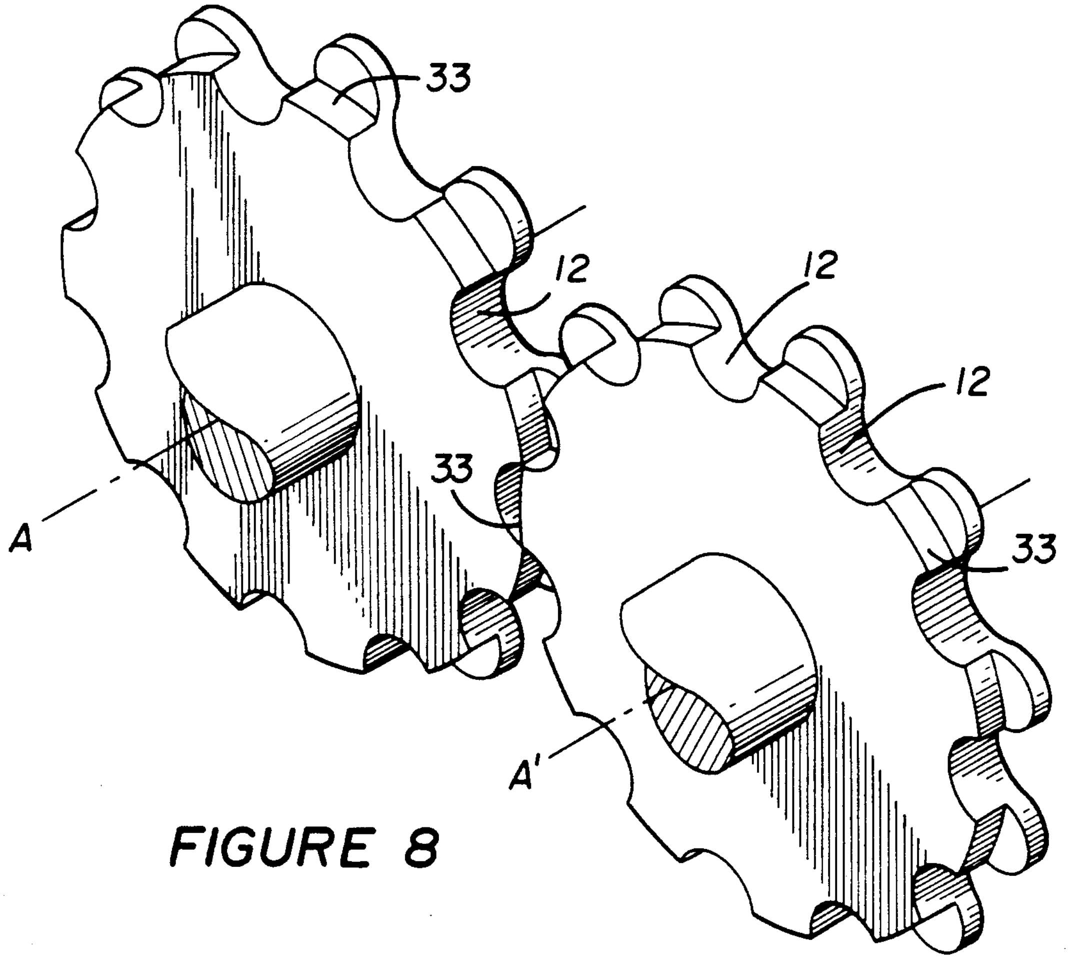
FIG. 8 depicts the embodiment where "U"-shaped depressions and flat sections alternate around the circumference of an individual roll.

In yet another embodiment, "U"-shaped depressions and flat sections alternate around the circumference of an individual roll. See FIG. 8. Therefore, moving around the circumference of an individual roll shows alternating pockets and flat sections. On an opposing roll is corresponding complimentary alternating pockets and flat sections. In order to obtain the preferred "D"-shaped briquets the two opposing rolls must be aligned such that the pockets on a first roll are faced with a flat area on a second opposing roll. In such an arrangement, the circumferential pockets and flat area on the first roll will correspond with the flat areas and pockets, respectively, on the second roll.

The opposed flat sides of the compressed briquets are formed in the pinch area 33 as the facing portions of the rotating rolls compact the material. The opposed flat sides are formed by the presence of vertical guide bar rods 20 either attached and positioned from above the rolls or attached and positioned from above the rolls or attached and positioned from below the rolls as described above. In an arrangement wherein only guide bar rods are used to form the sides, then no cheek plates are required.

In agreement with the criteria set forth above, the sides also can be formed by modified cheek plate and guide rod bar arrangement. That is, adjacent to the flat or smooth section on each roll is a radially disposed protrusion extending above the face of the roll. This element functions in the same manner as the full circumference radial cheek plate. That is, the protruding cheek plate portion interacts with channel 14 separating the individual rolls on each press roll. Therefore, each press roll would contain a series of such cheek plate portions corresponding to the flat or smooth sections on the circumference of the roll.

Preferably, the mold segments are unitized so that after excessive wear the molds and mold parts can be changed without the necessity of changing an entire roll assembly. This unitization includes, but is not limited to, the hopper, the press rolls, the cheek plates and protruding guide bar rods.

Accordingly it will be appreciated that the present invention provides a means of manufacturing a briquet of a chosen shape with designed parameters of desired and preferred geometric configuration having improved ignition and burn phase responses for anticipated applications such as cooking. It also will be appreciated that the present invention is particularly useful for manufacture of "D"-shaped briquets of various compositions and for other applications, but is not limited to the specific briquets disclosed herein.

What is claimed is:

1. A roll press apparatus for compressing particulate matter into briquettes comprising
   a series of individually paired rolls mounted for rotation in opposite directions about their respective axes, wherein
   a first series and a second series of rolls paired in a tangentially operative and cooperative relationship to form a pinch area therebetween,
   said first series of rolls, each individually having a plurality of circumferentially uniformly spaced U-shaped sideless depressions located in the face of each individual roll with circumferential channels spaced between each of said individual rolls,
   a second series of rolls, each individual roll having a flat smooth circumferential surface and cheek plates radially disposed around the roll and spaced apart a distance equal to that between two channels of said first series of rolls and,
   guide bar rods extending into said pinch area and interacting with alternating channels in said first series of rolls,
   drive means for rotating said rolls,
   feed means for charging particulate matter to be compressed into the pinch area of the cooperating rolls,
   such that on rotation of said paired rolls there is sequential formation of at least one pocket consisting of the U-shaped depression in the first roll forming a first side, the cheek plate of said second roll interacting with a bar rod extending into said pinch area and interacting with an alternating channel in said first roll forms a third side, and the flat surface of the second roll forms the closing fourth side.

2. The apparatus of claim 1 wherein said second series of rolls additionally includes a scraper means for removing attached molded briquettes therefrom.

3. The apparatus of claim 1 wherein said first series of rolls is made up of a multiple series of individual rolls having a plurality of uniform sideless depressions on the surface thereof.

4. The method of continuously preparing compressed particulate matter into D-shaped briquettes comprising
   charging the particulate matter to be briquetted into a roll press apparatus having a paired first roll and second roll;
   rotating said paired rolls in opposite directions while charging particulate matter to be compressed into individual depressions in the first roll while the depression is approaching a pinch area between said paired rolls;
   subjecting the particulate matter to compression within said roll press apparatus wherein the compression is performed by the tangential operative interaction of individually paired rolls forming a pinch area therebetween and having on said first roll circumferentially arranged U-shaped depressions separated by channels between rolls and on said second paired roll flat smooth surface separated by cheek plates spaced two widths apart and said cheek plates interacting with corresponding channels of said first roll, and cooperating therewith guide bar rods extending into said pinch area and interacting with the channels of said first roll.

5. The method of claim 4 wherein the resulting briquettes are ejected.

6. The method of claim 5 wherein the resulting briquettes are ejected substantially cleanly from the forming pocket without an ejection means.

7. The method of claim 4 wherein said particulate matter is charred material to form charcoal briquettes.

8. Roll press apparatus for compressing particulate matter into briquettes comprising
   (1) at least one cheek plate;
   (2) vertical guide rod bars;
   (3) a first opposing rotating press roll having a smooth surface circumferentially disposed protruding cheek plate;
   (4) a second opposing rotating pocketed press roll having sideless U-shaped depressions therein circumferentially disposed and separated by channels which alternately interacting with said cheek plates on said first rotating press roll and said vertical guide rode bars,
   provided that no more than two members selected from (1), (2), or (3) are in motion relative to the second opposing rotating pocket press, and
   further provided that the two opposing press rolls are aligned to tangentially operatively engage each other in a pinch area therebetween.

* * * * *